United States Patent
Perry, II

(10) Patent No.: US 11,480,812 B2
(45) Date of Patent: Oct. 25, 2022

(54) EYEGLASS FRAME CUSHIONING DEVICE

(71) Applicant: Ronald Perry, II, Oklahoma City, OK (US)

(72) Inventor: Ronald Perry, II, Oklahoma City, OK (US)

( * ) Notice: Subject to any disclaimer, the term of this patent is extended or adjusted under 35 U.S.C. 154(b) by 422 days.

(21) Appl. No.: 16/722,200

(22) Filed: Dec. 20, 2019

(65) Prior Publication Data

US 2021/0191151 A1  Jun. 24, 2021

(51) Int. Cl.
*G02C 5/14* (2006.01)

(52) U.S. Cl.
CPC .................... *G02C 5/14* (2013.01)

(58) Field of Classification Search
CPC ...................................... G02C 5/14
See application file for complete search history.

(56) References Cited

U.S. PATENT DOCUMENTS

| | | | |
|---|---|---|---|
| 2,147,802 A | 2/1939 | Scharfeld | |
| 5,005,263 A | 4/1991 | Barrett | |
| 7,011,406 B1 | 3/2006 | Kim | |
| 8,096,652 B1 | 1/2012 | Carbone | |
| 2006/0055875 A1* | 3/2006 | Yang | G02C 5/2263 |
| | | | 351/120 |
| 2006/0098160 A1 | 5/2006 | Jamie | |
| 2009/0059160 A1* | 3/2009 | Chen | G02C 5/10 |
| | | | 351/140 |
| 2013/0278885 A1* | 10/2013 | Hasky | G02C 3/003 |
| | | | 351/155 |
| 2016/0048025 A1* | 2/2016 | Cazalet | G02B 27/0176 |
| | | | 351/116 |
| 2017/0188947 A1* | 7/2017 | Connor | A61B 5/369 |
| 2017/0276958 A1* | 9/2017 | Friedfeld | G02C 5/16 |
| 2018/0078420 A1* | 3/2018 | Gustafsson | G02C 5/20 |
| 2019/0101977 A1* | 4/2019 | Armstrong-Muntner | G06N 20/00 |

FOREIGN PATENT DOCUMENTS

WO  WO2016025583  2/2016

* cited by examiner

*Primary Examiner* — William R Alexander
*Assistant Examiner* — Sharrief I Broome

(57) ABSTRACT

An eyeglass frame cushioning device for increasing comfort and stability of an eyeglass frame includes a pair of pads and a pair of couplers. The pads are resiliently compressible. Each coupler is coupled to an interior face of a respective pad and is configured to couple to an inner face of a respective sidearm of an eyeglass frame. The coupler is configured to selectively couple the respective pad to the respective sidearm of the eyeglass frame. The respective pad thus is configured to cushion the respective sidearm when in contact with a temple of a user. The respective pad also is configured to frictionally couple to the temple to decrease movement of the eyeglass frame relative to a head of the user, thereby reducing a need of the user to adjust the eyeglass frame.

9 Claims, 3 Drawing Sheets

EYEGLASS FRAME CUSHIONING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cushioning devices and more particularly pertains to a new cushioning device for increasing comfort and stability of an eyeglass frame.

(2) Description of Related Art Including Information Disclosed Under 37 CFR 1.97 and 1.98

The prior art relates to cushioning devices. Prior art devices for cushioning eyeglass frames may comprise pads couple to the bridge of the eyeglass frame or padded temple supports that elevate the bridge of an eyeglass frame above a nose of a user

BRIEF SUMMARY OF THE INVENTION

An embodiment of the disclosure meets the needs presented above by generally comprising a pair of pads and a pair of couplers. The pads are resiliently compressible. Each coupler is coupled to an interior face of a respective pad and is configured to couple to an inner face of a respective sidearm of an eyeglass frame. The coupler is configured to selectively couple the respective pad to the respective sidearm of the eyeglass frame. The respective pad thus is configured to cushion the respective sidearm when in contact with a temple of a user. The respective pad also is configured to frictionally couple to the temple to decrease movement of the eyeglass frame relative to a head of the user, thereby reducing a need of the user to adjust the eyeglass frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
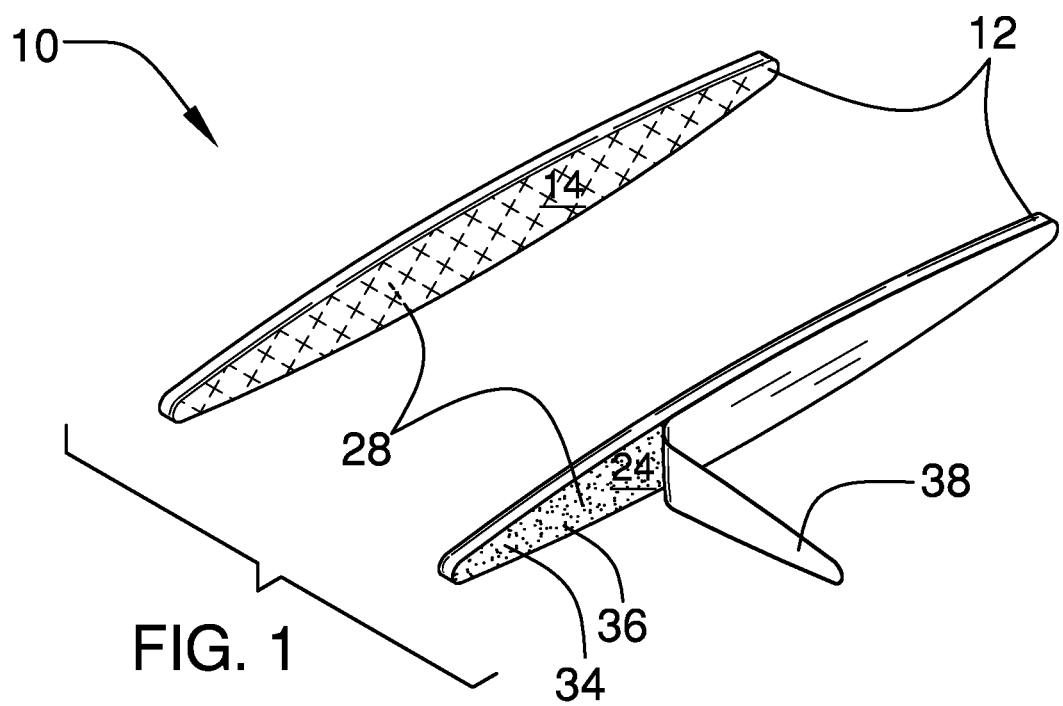
FIG. 1 is an isometric perspective view of an eyeglass frame cushioning device according to an embodiment of the disclosure.

With reference now to the drawings, and in particular to FIGS. 1 through 6 thereof, a new cushioning device embodying the principles and concepts of an embodiment of the disclosure and generally designated by the reference numeral 10 will be described.

As best illustrated in FIGS. 1 through 6, the eyeglass frame cushioning device 10 generally comprises a pair of pads 12 and a pair of couplers 28. The pads 12 are resiliently compressible. The pads 12 comprise at least one of rubber, silicone, and foamed elastomer. Each pad 12 has an exterior face 14 that is textured. As will become apparent below, texturing of the exterior face 14 of the pad 12 configures the pad 12 to frictionally couple to a temple of a user to decrease movement of an eyeglass frame 16 relative to a head of the user. The pad 12 may be elongated rectangularly shaped, or may be alternatively shaped, such as, but not limited to, ovally shaped, irregularly shaped, and the like.

Figure 4:
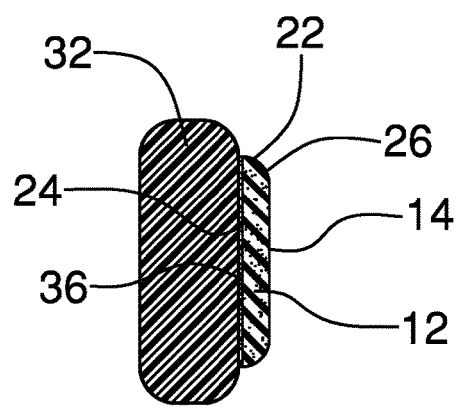
FIG. 4 is a cross-sectional view of an embodiment of the disclosure.
Figure 5:
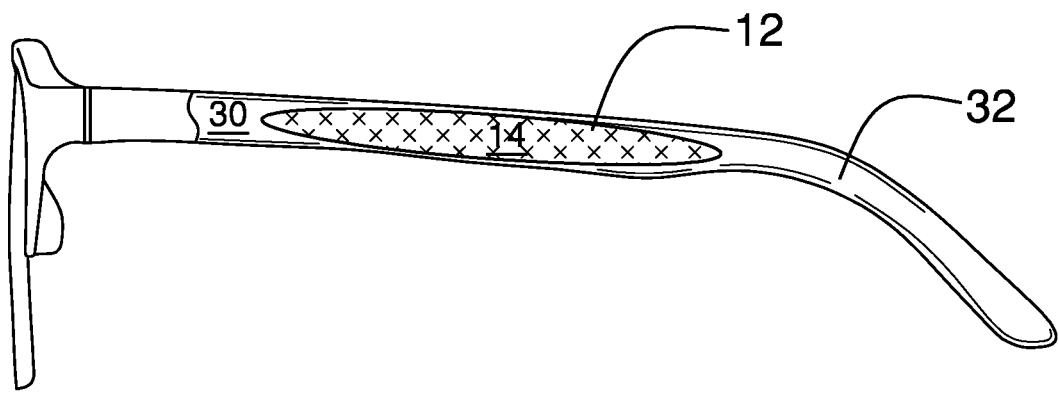
FIG. 5 is a side view of an embodiment of the disclosure.
Figure 6:
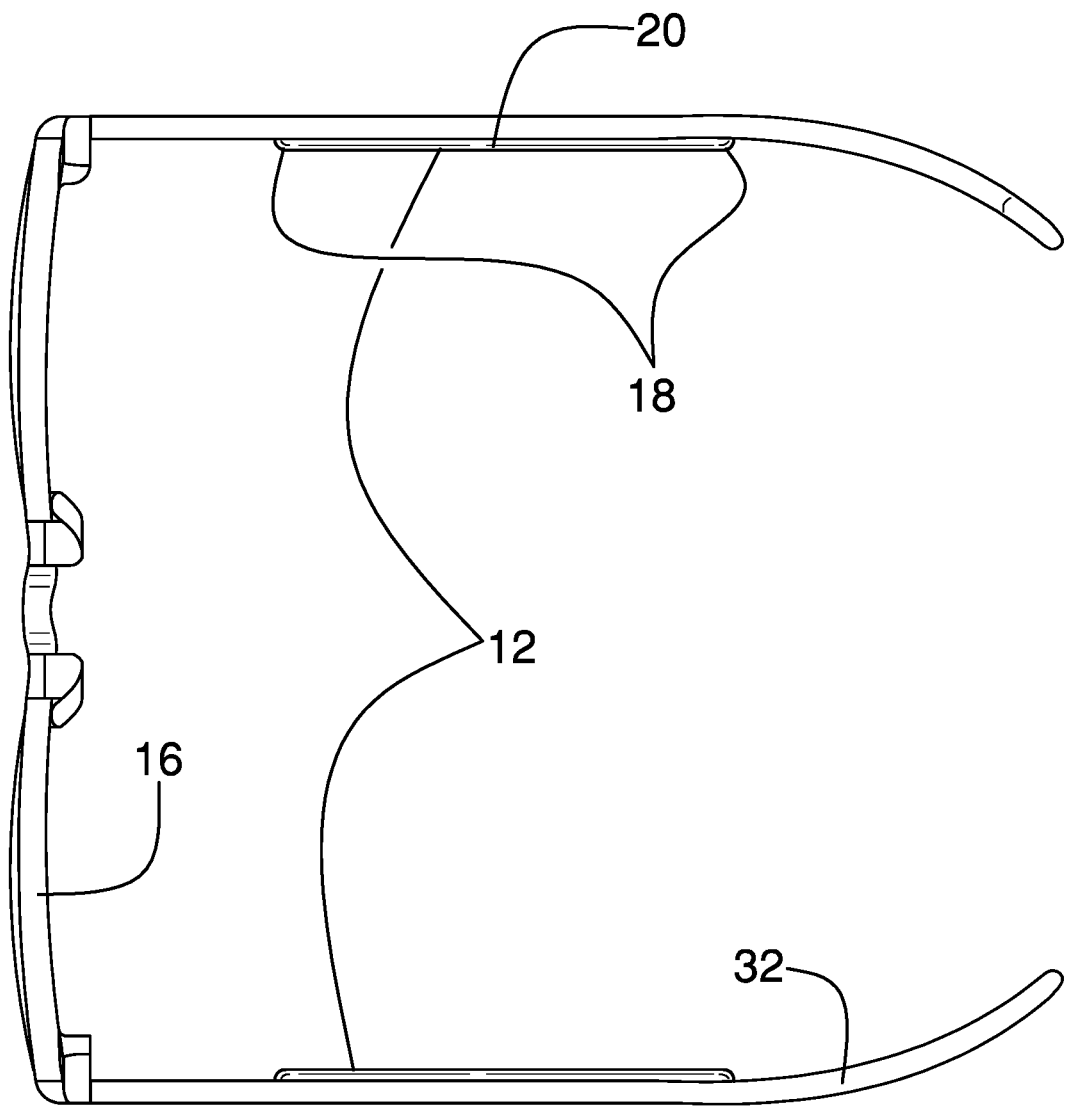
FIG. 6 is a bottom view of an embodiment of the disclosure.

The pad 12 has opposing ends 18 and a midpoint 20. The pad 12 tapers from the midpoint 20 to each opposing end 18. The pad 12 comprises a sidewall 22 that extends arcuately from the exterior face 14 to an interior face 24 of the pad 12, as shown in FIG. 4. As will become apparent, the sidewall 22 extending arcuately from the exterior face 14 to the interior face 24 of the pad 12 helps in preventing an edge 26 of the pad 12 from cutting into the temple of the user.

Each coupler 28 is coupled to the interior face 24 of a respective pad 12 and is configured to couple to an inner face 30 of a respective sidearm 32 of the eyeglass frame 16. The coupler 28 is configured to selectively couple the respective pad 12 to the respective sidearm 32 of the eyeglass frame 16. The respective pad 12 thus is configured to cushion the respective sidearm 32 when in contact with the temple of the user. The respective pad 12 also is configured to frictionally couple to the temple to decrease movement of the eyeglass frame 16 relative to the head of the user, thereby reducing a need of the user to adjust the eyeglass frame 16.

The coupler 28 may adhesive type, or alternative type, such as, but not limited to, clip type, hook and loop type, and the like. Each of a pair of first strips 34 is coupled to the interior face 24 of a respective pad 12. The first strip 34 comprises an adhesive 36. Each of a pair of second strips 38 is removably couplable to a respective first strip 34, as shown in FIG. 1. The second strip 38 is configured to prevent inadvertent adhesion of the respective first strip 34 and is positioned to be separated from the respective first strip 34, positioning the respective first strip 34 to be coupled to the inner face 30 of the respective sidearm 32 of the eyeglass frame 16.

Figure 2:
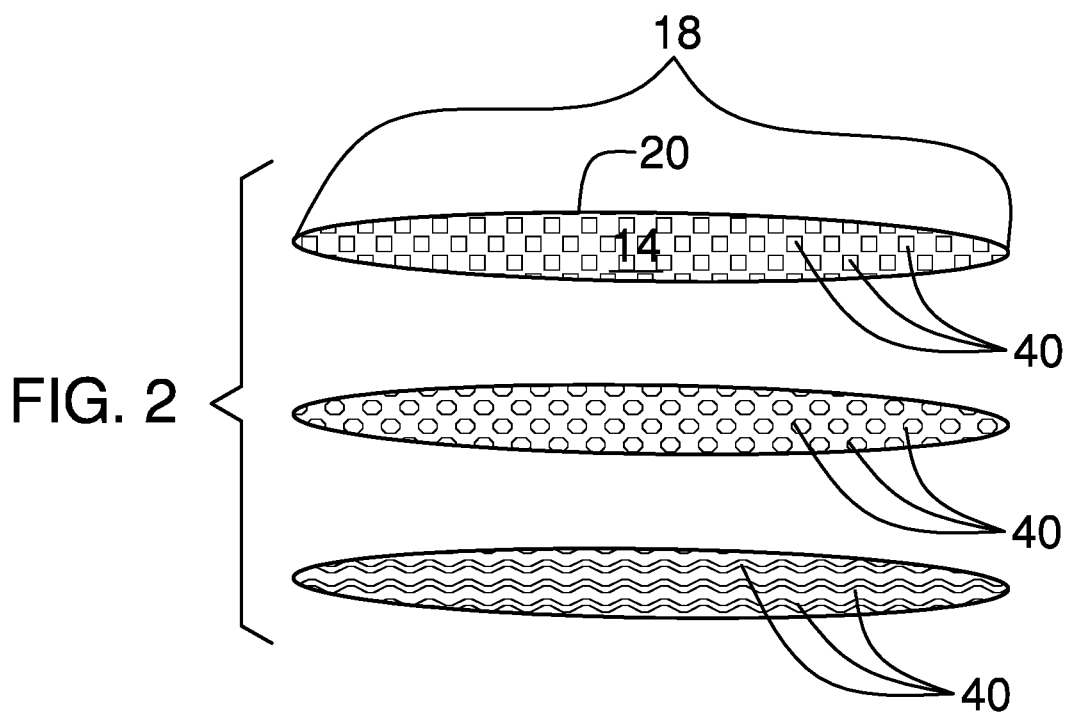
FIG. 2 is a side view of alternative embodiments of the disclosure.

Each of a plurality of protrusions 40 is coupled to and extends from the exterior face 14 of a respective pad 12. The protrusion 40 is configured to deter slippage of an associated sidearm 32 on the temple of the user. The protrusion 40 is at least one of squarely shaped, circularly shaped, and sinuously shaped, as shown in FIG. 2, and X-shaped, as shown in FIG. 1.

The present invention also anticipates the pair of pads 12 being integral to the eyeglass frame 16. The present invention also anticipates a pair of vibrators (not shown). Each vibrator would be positioned in and coupled to a respective pad 12. Selective actuation of the pair of vibrators would provide a massaging effect to the temples of the user.

Figure 3:
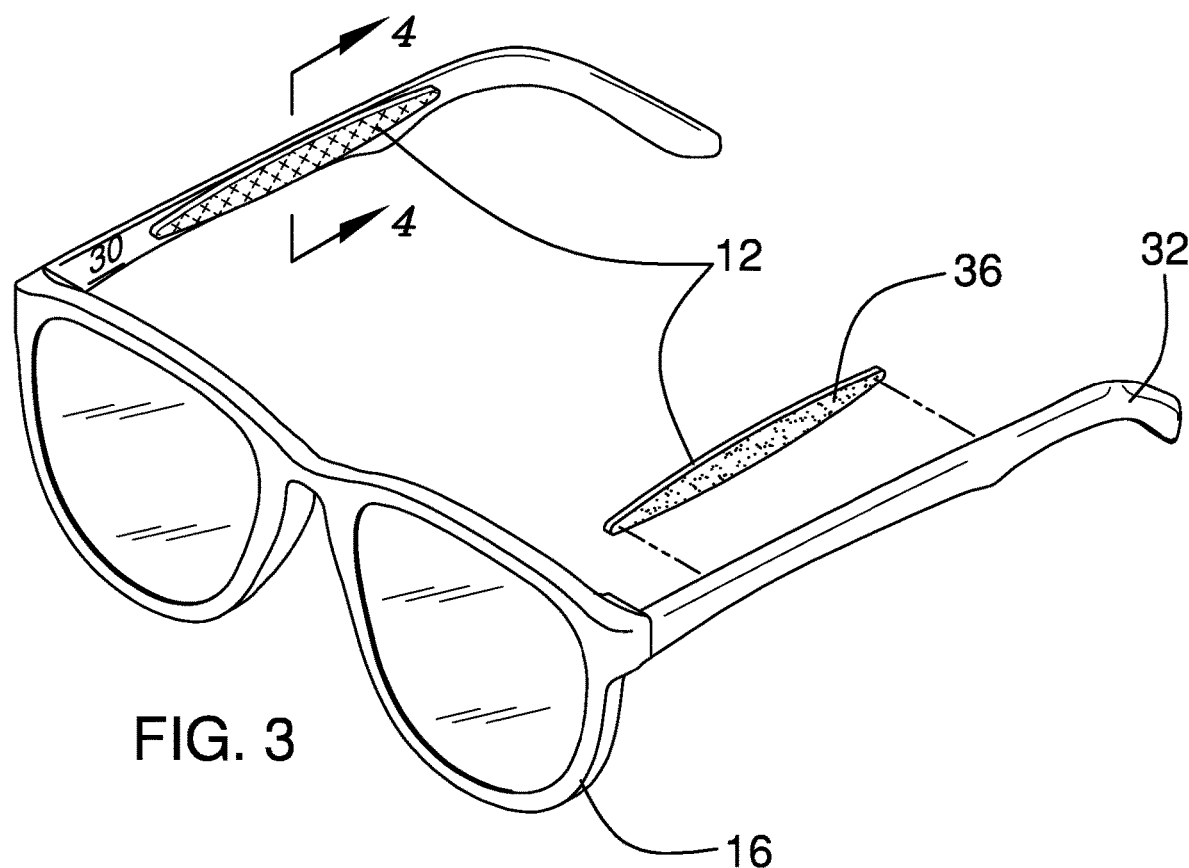
FIG. 3 is an in-use view of an embodiment of the disclosure.

In use, the second strip 38 is peeled from the first strip 34, positioning the adhesive 36 for coupling of the pad 12 to the inner face 30 of the sidearm 32 of the eyeglass frame 16, as shown in FIG. 3. When the eyeglass frame 16 is positioned on the head of the user, the pair of pads 12 is positioned in abutment to the temples of the user, where the pair of pads 12 is configured to cushion the sidearms 32 and to decrease movement of the eyeglass frame 16 relative to the head of the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An eyeglass frame cushioning device comprising:
   a pair of pads, the pads being resiliently compressible;
   a pair of couplers, each coupler being coupled to an interior face of a respective pad, the coupler being configured for coupling to an inner face of a respective sidearm of an eyeglass frame wherein the coupler is configured for selectively coupling the respective pad to the respective sidearm of the eyeglass frame wherein the respective pad is configured for cushioning the respective sidearm when in contact with a temple of a user and for frictionally coupling to the temple fir decreasing movement of the eyeglass frame relative to a head of the user, the coupler being adhesive type;
   a pair of first strips, each first strip being coupled to the interior face of a respective pad, the first strip comprising an adhesive; and
   a pair of second strips, each second strip being removably couplable to a respective first strip wherein the second strip is configured for preventing inadvertent adhesion of the respective first strip and such that the second strip is positioned for separating from the respective first strip positioning the respective first strip for coupling to the inner face of the respective sidearm of the eyeglass frame.

2. The device of claim 1, further including the pads comprising at least one of rubber, silicone, and foamed elastomer.

3. The device of claim I, further including each pad having an exterior face, the exterior face being textured wherein the exterior face is configured for frictionally coupling to the temple for decreasing movement of the eyeglass frame relative to the head of the user.

4. The device of claim 1, further including the pad being elongated rectangularly shaped.

5. The device of claim 4, further including the pad having opposing ends and a midpoint, the pad tapering from the midpoint to each opposing end.

6. The device of claim 1, further including the pad comprising a sidewall, the sidewall extending arcuately from the exterior face to the interior face of the pad.

7. The device of claim 3, further including a plurality of protrusions, each protrusion being coupled to and extending from the exterior face of a respective pad wherein the protrusion is configured for deterring slippage of an associated sidearm on the temple of the user.

8. The device of claim 7, further including the protrusion being at least one of X-shaped, squarely shaped, circularly shaped, and sinuously shaped.

9. An eyeglass frame cushioning device comprising:
   a pair of pads, the pads being resiliently compressible, the pads comprising at least one of rubber, silicone, and foamed elastomer, each pad having an exterior face, the exterior face being textured, the pad being elongated rectangularly shaped, the pad having opposing ends and a midpoint, the pad tapering from the midpoint to each opposing end, the pad comprising a sidewall, the sidewall extending arcuately from the exterior face to an interior face of the pad;
   a pair of couplers, each coupler being coupled to the interior face of a respective pad, the coupler being configured for coupling to an inner face of a respective sidearm of an eyeglass frame wherein the coupler is configured for selectively coupling the respective pad to the respective sidearm of the eyeglass frame wherein the respective pad is configured for cushioning the respective sidearm when in contact with a temple of a user and wherein the exterior face is configured for frictionally coupling to the temple for decreasing movement of the eyeglass frame relative to a head of the user, the coupler being adhesive type;
   a pair of first strips, each first strip being coupled to the interior face of a respective pad, the first strip comprising an adhesive;

a pair of second strips, each second strip being removably coupiable to a respective first strip wherein the second strip is configured for preventing inadvertent adhesion of the respective first strip and such that the second strip is positioned for separating from the respective first strip positioning the respective first strip for coupling to the inner face of the respective sidearm of the eyeglass frame; and a plurality of protrusions, each protrusion being coupled to and extending from the exterior face of a respective pad wherein the protrusion is configured for deterring slippage of an associated sidearm on the temple of the user, the protrusion being at least one of X-shaped, squarely shaped, circularly shaped, and sinuously shaped.

\* \* \* \* \*